(12) United States Patent
Taylor et al.

(10) Patent No.: US 7,768,904 B2
(45) Date of Patent: *Aug. 3, 2010

(54) METHOD AND SYSTEM FOR FAIL-SAFE RENAMING OF LOGICAL CIRCUIT IDENTIFIERS FOR REROUTED LOGICAL CIRCUITS IN A DATA NETWORK

(75) Inventors: William Taylor, Duluth, GA (US); David Massengill, Covington, GA (US); John Hollingsworth, Covington, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 866 days.

This patent is subject to a terminal disclaimer.

(21) Appl. No.: 10/829,495

(22) Filed: Apr. 22, 2004

(65) Prior Publication Data

US 2005/0238006 A1    Oct. 27, 2005

(51) Int. Cl.
G01R 31/08   (2006.01)
G06F 11/00   (2006.01)
H04L 12/28   (2006.01)
H04L 12/56   (2006.01)

(52) U.S. Cl. .................. 370/216; 370/254; 370/395.32
(58) Field of Classification Search .................. None
See application file for complete search history.

(56) References Cited

U.S. PATENT DOCUMENTS

| | | |
|---|---|---|
| 4,905,233 A | 2/1990 | Cain et al. |
| 5,016,244 A | 5/1991 | Massey, Jr. et al. |
| 5,065,392 A | 11/1991 | Sibbitt et al. |
| 5,241,534 A | 8/1993 | Omuro et al. |
| 5,265,092 A | 11/1993 | Soloway et al. |

(Continued)

OTHER PUBLICATIONS

Don Ryan, The Telco Handbook for New Technicians—An Introduction To Telco Technology And Troubleshooting, Oct. 27, 2000, [retrieved from http://www.darkwing.netlaaron/telco.doc, accessed on Nov. 2, 2006], 67 pages.

(Continued)

*Primary Examiner*—Chirag G Shah
*Assistant Examiner*—Ashley L Shivers
(74) *Attorney, Agent, or Firm*—Hanley, Flight and Zimmerman, LLC

(57) ABSTRACT

A method and system are provided for fail-safe renaming of logical circuit identifiers for rerouted logical circuits in a data network. A network management module is provided for accessing a network device provisioned for routing data over a first logical circuit in the data network. The network management module is further utilized for deleting the first logical circuit in the network device upon detecting a failure in the first logical circuit and provisioning a second logical circuit in the network device for rerouting the data from the first logical circuit. In provisioning the second logical circuit, the network management module is utilized to assign a second logical circuit identifier to identify the second logical circuit. The network management module is further utilized for renaming a first logical circuit identifier to the second logical circuit identifier and renaming a logical circuit label for the first logical circuit in a logical element module in communication with the network management module. The renamed logical circuit label includes the first logical circuit identifier and may be utilized to indicate that the logical circuit data from the failed logical circuit has been rerouted.

22 Claims, 5 Drawing Sheets

U.S. PATENT DOCUMENTS

| | | | |
|---|---|---|---|
| 5,375,126 A | 12/1994 | Wallace | |
| 5,408,461 A | 4/1995 | Uriu et al. | |
| 5,539,817 A | 7/1996 | Wilkes | |
| 5,544,170 A | 8/1996 | Kasahara | |
| 5,548,639 A | 8/1996 | Ogura et al. | |
| 5,559,959 A | 9/1996 | Foglar | |
| 5,629,938 A | 5/1997 | Cerciello et al. | |
| 5,633,859 A | 5/1997 | Jain et al. | |
| 5,650,994 A * | 7/1997 | Daley | 370/259 |
| 5,764,626 A | 6/1998 | VanDervort | |
| 5,812,528 A | 9/1998 | VanDervort | |
| 5,832,197 A | 11/1998 | Houji | |
| 5,848,055 A | 12/1998 | Fedyk et al. | |
| 5,856,981 A | 1/1999 | Voelker | |
| 5,894,475 A | 4/1999 | Bruno et al. | |
| 5,926,456 A | 7/1999 | Takano et al. | |
| 5,936,939 A | 8/1999 | Des Jardins et al. | |
| 6,028,863 A | 2/2000 | Sasagawa et al. | |
| 6,038,219 A | 3/2000 | Mawhinney et al. | |
| 6,091,951 A | 7/2000 | Sturniolo et al. | |
| 6,104,998 A | 8/2000 | Galand et al. | |
| 6,108,300 A * | 8/2000 | Coile et al. | 370/217 |
| 6,108,307 A | 8/2000 | McConnell et al. | |
| 6,118,763 A | 9/2000 | Trumbull | |
| 6,147,998 A | 11/2000 | Kelley et al. | |
| 6,167,025 A | 12/2000 | Hsing et al. | |
| 6,181,675 B1 | 1/2001 | Miyamoto | |
| 6,181,679 B1 * | 1/2001 | Ashton et al. | 370/244 |
| 6,185,695 B1 | 2/2001 | Murphy et al. | |
| 6,195,416 B1 | 2/2001 | DeCaluwe et al. | |
| 6,259,696 B1 | 7/2001 | Yazaki et al. | |
| 6,269,401 B1 | 7/2001 | Fletcher et al. | |
| 6,311,288 B1 * | 10/2001 | Heeren et al. | 714/4 |
| 6,360,260 B1 | 3/2002 | Compliment et al. | |
| 6,366,581 B1 | 4/2002 | Jepsen | |
| 6,377,548 B1 | 4/2002 | Chuah | |
| 6,421,722 B1 | 7/2002 | Bauer et al. | |
| 6,424,629 B1 | 7/2002 | Rubino et al. | |
| 6,449,259 B1 | 9/2002 | Allain et al. | |
| 6,456,306 B1 | 9/2002 | Chin et al. | |
| 6,473,398 B1 | 10/2002 | Wall et al. | |
| 6,535,990 B1 | 3/2003 | Iterum et al. | |
| 6,538,987 B1 | 3/2003 | Cedrone et al. | |
| 6,549,533 B1 | 4/2003 | Campbell | |
| 6,553,015 B1 | 4/2003 | Sato | |
| 6,556,659 B1 | 4/2003 | Bowman-Amuah | |
| 6,570,846 B1 | 5/2003 | Ryoo | |
| 6,581,166 B1 | 6/2003 | Hirst et al. | |
| 6,590,899 B1 | 7/2003 | Thomas et al. | |
| 6,594,246 B1 | 7/2003 | Jorgensen | |
| 6,594,268 B1 | 7/2003 | Aukia et al. | |
| 6,597,689 B1 | 7/2003 | Chiu et al. | |
| 6,608,831 B1 | 8/2003 | Beckstrom et al. | |
| 6,625,114 B1 | 9/2003 | Hassell | |
| 6,643,254 B1 | 11/2003 | Kajitani et al. | |
| 6,687,228 B1 | 2/2004 | Fichou et al. | |
| 6,697,329 B1 * | 2/2004 | McAllister et al. | 370/235 |
| 6,711,125 B1 | 3/2004 | Walrand et al. | |
| 6,716,165 B1 | 4/2004 | Flanders et al. | |
| 6,738,459 B1 | 5/2004 | Johnstone et al. | |
| 6,763,476 B1 | 7/2004 | Dangi et al. | |
| 6,766,113 B1 | 7/2004 | Al-Salameh et al. | |
| 6,781,952 B2 | 8/2004 | Shirakawa | |
| 6,795,393 B1 | 9/2004 | Mazzurco et al. | |
| 6,795,394 B1 | 9/2004 | Swinkels et al. | |
| 6,810,043 B1 | 10/2004 | Naven et al. | |
| 6,823,477 B1 | 11/2004 | Cheng et al. | |
| 6,826,184 B1 | 11/2004 | Bryenton et al. | |
| 6,829,223 B1 | 12/2004 | Richardson et al. | |
| 6,862,351 B2 | 3/2005 | Taylor | |
| 6,865,170 B1 | 3/2005 | Zendle | |
| 6,882,652 B1 | 4/2005 | Scholtens et al. | |
| 6,925,578 B2 | 8/2005 | Lam et al. | |
| 6,952,395 B1 | 10/2005 | Manoharan et al. | |
| 6,973,034 B1 | 12/2005 | Natarajan et al. | |
| 6,973,037 B1 | 12/2005 | Kahveci | |
| 6,978,394 B1 | 12/2005 | Charny et al. | |
| 6,981,039 B2 | 12/2005 | Cerami et al. | |
| 6,983,401 B2 | 1/2006 | Taylor | |
| 6,990,616 B1 | 1/2006 | Botton-Dascal et al. | |
| 7,027,053 B2 | 4/2006 | Berndt et al. | |
| 7,072,331 B2 | 7/2006 | Liu et al. | |
| 7,093,155 B2 | 8/2006 | Aoki | |
| 7,120,148 B1 | 10/2006 | Batz et al. | |
| 7,120,819 B1 | 10/2006 | Gurer et al. | |
| 7,146,000 B2 | 12/2006 | Hollman et al. | |
| 7,165,192 B1 | 1/2007 | Cadieux et al. | |
| 7,200,148 B1 | 4/2007 | Taylor et al. | |
| 7,209,452 B2 | 4/2007 | Taylor et al. | |
| 7,240,364 B1 | 7/2007 | Branscomb et al. | |
| 7,275,192 B2 | 9/2007 | Taylor et al. | |
| 7,287,083 B1 | 10/2007 | Nay et al. | |
| 7,350,099 B2 | 3/2008 | Taylor et al. | |
| 7,391,734 B2 | 6/2008 | Taylor et al. | |
| 7,460,468 B2 | 12/2008 | Taylor et al. | |
| 7,466,646 B2 | 12/2008 | Taylor et al. | |
| 7,469,282 B2 | 12/2008 | Taylor et al. | |
| 7,609,623 B2 | 10/2009 | Taylor et al. | |
| 7,630,302 B2 | 12/2009 | Taylor et al. | |
| 7,639,606 B2 | 12/2009 | Taylor et al. | |
| 7,639,623 B2 | 12/2009 | Taylor et al. | |
| 7,646,707 B2 | 1/2010 | Taylor et al. | |
| 2001/0000700 A1 | 5/2001 | Eslambolchi et al. | |
| 2002/0001307 A1 | 1/2002 | Nguyen et al. | |
| 2002/0072358 A1 | 6/2002 | Schneider et al. | |
| 2002/0089985 A1 * | 7/2002 | Wahl et al. | 370/395.1 |
| 2002/0112072 A1 | 8/2002 | Jain | |
| 2002/0172148 A1 | 11/2002 | Kim et al. | |
| 2002/0181402 A1 | 12/2002 | Lemoff et al. | |
| 2003/0043753 A1 | 3/2003 | Nelson et al. | |
| 2003/0051049 A1 | 3/2003 | Noy et al. | |
| 2003/0051195 A1 | 3/2003 | Bosa et al. | |
| 2003/0086413 A1 | 5/2003 | Tartarelli et al. | |
| 2003/0091024 A1 | 5/2003 | Stumer | |
| 2003/0092390 A1 | 5/2003 | Haumont | |
| 2003/0117951 A1 | 6/2003 | Wiebe et al. | |
| 2003/0128692 A1 | 7/2003 | Mitsumori et al. | |
| 2003/0152028 A1 | 8/2003 | Raisanen et al. | |
| 2003/0185151 A1 | 10/2003 | Kurosawa et al. | |
| 2004/0090918 A1 | 5/2004 | McLendon | |
| 2004/0090973 A1 | 5/2004 | Christie et al. | |
| 2004/0125776 A1 | 7/2004 | Haugli et al. | |
| 2004/0141464 A1 | 7/2004 | Taylor et al. | |
| 2004/0172574 A1 | 9/2004 | Wing et al. | |
| 2005/0002339 A1 | 1/2005 | Patil et al. | |
| 2005/0013242 A1 * | 1/2005 | Chen et al. | 370/228 |
| 2005/0135237 A1 | 6/2005 | Taylor et al. | |
| 2005/0135238 A1 * | 6/2005 | Taylor et al. | 370/228 |
| 2005/0135254 A1 | 6/2005 | Taylor et al. | |
| 2005/0135263 A1 | 6/2005 | Taylor et al. | |
| 2005/0138203 A1 | 6/2005 | Taylor et al. | |
| 2005/0138476 A1 | 6/2005 | Taylor et al. | |
| 2005/0152028 A1 | 7/2005 | Mitzkus | |
| 2005/0172160 A1 | 8/2005 | Taylor et al. | |
| 2005/0172174 A1 | 8/2005 | Taylor et al. | |
| 2005/0237925 A1 | 10/2005 | Taylor et al. | |
| 2005/0238006 A1 | 10/2005 | Taylor et al. | |
| 2005/0238007 A1 | 10/2005 | Taylor et al. | |
| 2005/0238024 A1 | 10/2005 | Taylor et al. | |
| 2005/0240840 A1 | 10/2005 | Taylor et al. | |
| 2005/0276216 A1 | 12/2005 | Vasseur et al. | |
| 2006/0013210 A1 | 1/2006 | Bordogna et al. | |
| 2006/0146700 A1 * | 7/2006 | Taylor et al. | 370/225 |
| 2006/0153066 A1 | 7/2006 | Saleh et al. | |

| | | | |
|---|---|---|---|
| 2007/0050492 | A1 | 3/2007 | Jorgensen |
| 2007/0168200 | A1 | 7/2007 | Shimizu |
| 2009/0041012 | A1 | 2/2009 | Taylor et al. |
| 2009/0086626 | A1 | 4/2009 | Taylor et al. |
| 2009/0103544 | A1 | 4/2009 | Taylor et al. |
| 2009/0323534 | A1 | 12/2009 | Taylor et al. |
| 2010/0020677 | A1 | 1/2010 | Taylor et al. |
| 2010/0046366 | A1 | 2/2010 | Taylor et al. |
| 2010/0046380 | A1 | 2/2010 | Taylor et al. |
| 2010/0054122 | A1 | 3/2010 | Taylor et al. |

OTHER PUBLICATIONS

United States Patent and Trademark Office, "Supplemental Notice of Allowance," issued in connection with U.S. Appl. No. 10/829,795, on Nov. 13, 2008 (2 pages).
United States Patent and Trademark Office, "Notice of Allowance," issued in connection with U.S. Appl. No. 10/829,795, on Sep. 9, 2008 (7 pages).
United States Patent and Trademark Office, "Interview Summary," issued in connection with U.S. Appl. No. 10/829,795, on Aug. 1, 2008 (2 pages).
United States Patent and Trademark Office, "Final Office Action," issued in connection with U.S. Appl. No. 10/829,539, on Mar. 13, 2009 (30 pages).
United States Patent and Trademark Office, "Advisory Action," issued in connection with U.S. Appl. No. 10/829,539, on Jun. 12, 2009 (3 pages).
United States Patent and Trademark Office, "Interview Summary," issued in connection with U.S. Appl. No. 10/829,539, on Apr. 28, 2008 (2 pages).
United States Patent and Trademark Office, "Notice of Allowance," issued in connection with U.S. Appl. No. 10/829,509, on Jul. 10, 2007 (7 pages).
United States Patent and Trademark Office, "Notice of Allowance," issued in connection with U.S. Appl. No. 10/829,509, on Feb. 1, 2007 (8 pages).
United States Patent and Trademark Office, "Interview Summary," issued in connection with U.S. Appl. No. 10/829,509, on Sep. 20, 2006 (4 pages).
United States Patent and Trademark Office, "Notice of Allowance," issued in connection with U.S. Appl. No. 10/744,281, on Oct. 30, 2007 (8 pages).
United States Patent and Trademark Office, "Notice of Allowance," issued in connection with U.S. Appl. No. 10/744,281, on Aug. 27, 2007 (6 pages).
United States Patent and Trademark Office, "Interview Summary," issued in connection with U.S. Appl. No. 10/744,281, on Aug. 6, 2007 (3 pages).
United States Patent and Trademark Office, "Interview Summary," issued in connection with U.S. Appl. No. 10/744,281, on Nov. 27, 2006 (3 pages).
United States Patent and Trademark Office, "Final Office Action," issued in connection with U.S. Appl. No. 10/744,921, on Apr. 6, 2009 (34 pages).
United States Patent and Trademark Office, "Non-Final Office Action," issued in connection with U.S. Appl. No. 10/744,921, on Jul. 9, 2009 (27 pages).
United States Patent and Trademark Office, "Final Office Action," issued in connection with U.S. Appl. No. 10/745,047, on Mar. 27, 2009 (19 pages).
United States Patent and Trademark Office, "Notice of Allowance," issued in connection with U.S. Appl. No. 10/745,168, on Jun. 12, 2009 (22 pages).
United States Patent and Trademark Office, "Notice of Allowance," issued in connection with U.S. Appl. No. 10/745,117, on May 14, 2009 (32 pages).
United States Patent and Trademark Office, "Supplemental Notice of Allowance," issued in connection with U.S. Appl. No. 10/745,117, on Jun. 15, 2009 (4 pages).
United States Patent and Trademark Office, "Office Communication—No Action Count," issued in connection with U.S. Appl. No. 10/829,584, on Oct. 16, 2008 (4 pages).
United States Patent and Trademark Office, "Notice of Allowance," issued in connection with U.S. Appl. No. 10/829,584, on Sep. 22, 2008 (7 pages).
United States Patent and Trademark Office, "Notice of Allowance," issued in connection with U.S. Appl. No. 10/745,116, on May 7, 2009 (17 pages).
United States Patent and Trademark Office, "Notice of Allowance," issued in connection with U.S. Appl. No. 10/745,116, on Dec. 3, 2008 (8 pages).
United States Patent and Trademark Office, "Non-Final Office Action," issued in connection with U.S. Appl. No. 10/744,283, on Apr. 14, 2009 (14 pages).
United States Patent and Trademark Office, "Final Office Action," issued in connection with U.S. Appl. No. 10/745,170, on Apr. 28, 2009 (21 pages).
United States Patent and Trademark Office, "Advisory Action," issued in connection with U.S. Appl. No. 10/745,170, on Oct. 21, 2008 (3 pages).
United States Patent and Trademark Office, "Final Office Action," issued in connection with U.S. Appl. No. 10/744,555, on Jul. 17, 2009 (27 pages).
United States Patent and Trademark Office, "Notice of Allowance," issued in connection with U.S. Appl. No. 10/348,077, on Apr. 29, 2008 (10 pages).
United States Patent and Trademark Office, "Interview Summary," issued in connection with U.S. Appl. No. 10/348,077, on May 11, 2007 (2 pages).
United States Patent and Trademark Office, "Notice of Allowance," issued in connection with U.S. Appl. No. 10/348,592, on Oct. 14, 2008 (4 pages).
United States Patent and Trademark Office, "Final Office Action," issued in connection with U.S. Appl. No. 10/348,592, on Mar. 21, 2008 (11 pages).
United States Patent and Trademark Office, "Non-Final Office Action," issued in connection with U.S. Appl. No. 10/348,592, on Jun. 14, 2007 (10 pages).
United States Patent and Trademark Office, "Non-Final Office Action," issued in connection with U.S. Appl. No. 10/348,592, on Sep. 8, 2006 (7 pages).
Official Action dated May 15, 2006, in U.S. Appl. No. 10/829,509 (11 pages).
Official Action dated Oct. 2, 2006, in U.S. Appl. No. 10/744,281 (16 pages).
Official Action dated Nov. 13, 2006, in U.S. Appl. No. 10/829,509 (12 pages).
Official Action dated Jan. 4, 2007, in U.S. Appl. No. 10/348,077 (16 pages).
Official Action dated Apr. 17, 2007, in U.S. Appl. No. 10/744,281 (18 pages).
Official Action dated Jul. 20, 2007, in U.S. Appl. No. 10/744,283 (12 pages).
Official Action dated Jul. 20, 2007, in U.S. Appl. No. 10/745,170 (14 pages).
Official Action dated Aug. 6, 2007, in U.S. Appl. No. 10/744,555 (18 pages).
Official Action dated Aug. 7, 2007, in U.S. Appl. No. 10/745,116 (20 pages).
Official Action dated Aug. 8, 2007, in U.S. Appl. No. 10/744,921 (17 pages).
Official Action dated Aug. 8, 2007, in U.S. Appl. No. 10/745,117 (15 pages).
Official Action dated Aug. 8, 2007, in U.S. Appl. No. 10/745,168 (18 pages).
Official Action dated Aug. 10, 2007, in U.S. Appl. No. 10/348,077 (26 pages).
Official Action dated Sep. 10, 2007, in U.S. Appl. No. 10/829,795 (21 pages).
Official Action dated Sep. 19, 2007, in U.S. Appl. No. 10/829,584 (15 pages).
Official Action dated Oct. 17, 2007, in U.S. Appl. No. 10/829,539 (19 pages).
Official Action dated Apr. 17, 2008, in U.S. Appl. No. 10/744,283 (11 pages).

Official Action dated Apr. 17, 2008, in U.S. Appl. No. 10/745,117 (15 pages).
Official Action dated Apr. 17, 2008, in U.S. Appl. No. 10/745,170 (14 pages).
Official Action dated Apr. 28, 2008, in U.S. Appl. No. 10/745,116 (25 pages).
Official Action dated Apr. 30, 2008, in U.S. Appl. No. 10/829,795 (20 pages).
Official Action dated May 1, 2008, in U.S. Appl. No. 10/744,921 (24 pages).
Official Action dated May 2, 2008, in U.S. Appl. No. 10/745,168 (21 pages).
Official Action dated May 12, 2008, in U.S. Appl. No. 10/744,555 (32 pages).
Official Action dated May 12, 2008, in U.S. Appl. No. 10/745,117 (15 pages).
Official Action dated Jun. 12, 2008, in U.S. Appl. No. 10/745,047 (18 pages).
Official Action dated Jun. 25, 2008, in U.S. Appl. No. 10/829,584 (20 pages).
Official Action dated Aug. 20, 2008, in U.S. Appl. No. 10/829,539 (29 pages).
Official Action dated Oct. 30, 2008, in U.S. Appl. No. 10/744,283 (13 pages).
Official Action dated Oct. 31, 2008, in U.S. Appl. No. 10/744,921 (25 pages).
Official Action dated Nov. 14, 2008, in U.S. Appl. No. 10/745,170 (21 pages).
Official Action dated Nov. 25, 2008, in U.S. Appl. No. 10/829,539 (23 pages).
Official Action dated Nov. 26, 2008, in U.S. Appl. No. 10/745,117 (21 pages).
Official Action dated Dec. 2, 2008, in U.S. Appl. No. 10/745,168 (25 pages).
Official Action dated Jan. 14, 2009, in U.S. Appl. No. 10/744,555 (37 pages).
Chen, Thomas M. and Liu, Steve S., Management and Control Functions in ATM Switching Systems, IEEE Network, Jul./Aug. 1994 (7 pages).
Meserole, Thomas A. and Prasad, Anil Customer Network Management (CNM) for ATM Public Network Service (M3 Specification), af-nm-0019.000, Rev. 1.04, Oct. 1994 (13 pages).
Mangan, Tim, OA&M: How a Frame Relay SLA is Measured and Diagnosed, http://www.mfaforum.org/frame/Whitepaper/whitepapers/OAMwhitepaper/shtml (11 pages).
United States Patent and Trademark Office, "Non-Final Office Action," issued in connection with U.S. Appl. No. 10/744,555, on Feb. 1, 2010 (26 pages).
United States Patent and Trademark Office, "Notice of Allowance," issued in connection with U.S. Appl. No. 10/745,116, on Aug. 14, 2009 (7 pages).
United States Patent and Trademark Office, "Notice of Allowance," issued in connection with U.S. Appl. No. 10/745,168, on Aug. 7, 2009 (7 pages).
United States Patent and Trademark Office, "Notice of Allowance," issued in connection with U.S. Appl. No. 10/745,117, on Aug. 27, 2009 (7 pages).
United States Patent and Trademark Office, "Non-Final Office Action," issued in connection with U.S. Appl. No. 10/829,539, on Aug. 25, 2009 (41 pages).
United States Patent and Trademark Office, "Notice of Allowance," issued in connection with U.S. Appl. No. 10/745,047, on Jul. 23, 2009 (7 pages).
United States Patent and Trademark Office, "Notice of Allowance," issued in connection with U.S. Appl. No. 10/744,283, on Sep. 18, 2009 (11 pages).
United States Patent and Trademark Office, "Non-Final Office Action," issued in connection with U.S. Appl. No. 10/745,170, on Oct. 14, 2009 (23 pages).
United States Patent and Trademark Office, "Final Office Action," issued in connection with U.S. Appl. No. 10/744,921, on Mar. 3, 2010 (23 pages).
United States Patent and Trademark Office, "Non-Final Office Action," issued in connection with U.S. Appl. No. 10/745,170, on Mar. 30, 2010 (24 pages).
United States Patent and Trademark Office, "Non-Final Office Action," issued in connection with U.S. Appl. No. 12/254,233, on Apr. 15, 2010 (24 pages).
United States Patent and Trademark Office, "Non-Final Office Action," issued in connection with U.S. Appl. No. 12/334,248, on Apr. 13, 2010 (23 pages).
United States Patent and Trademark Office, "Non-Final Office Action," issued in connection with U.S. Appl. No. 12/339,426, on Mar. 8, 2010 (6 pages).
United States Patent and Trademark Office, "Non-Final Office Action," issued in connection with U.S. Appl. No. 10/829,539, on Apr. 27, 2010 (32 pages).

* cited by examiner

METHOD AND SYSTEM FOR FAIL-SAFE RENAMING OF LOGICAL CIRCUIT IDENTIFIERS FOR REROUTED LOGICAL CIRCUITS IN A DATA NETWORK

CROSS-REFERENCE TO RELATED APPLICATIONS

This patent is related to U.S. patent application Ser. No. 10/348,077, entitled "Method and System for Obtaining Logical Performance Data for a Circuit in a Data Network," filed on Jan. 21, 2003, and U.S. patent application Ser. No. 10/348,592, entitled "Method and System for Provisioning and Maintaining a Circuit in a Data Network," filed on Jan. 21, 2003. This application is also related to U.S. patent application Ser. No. 10/745,117 entitled "Method And System For Providing A Failover Circuit For Rerouting Logical Circuit Data In A Data Network," filed on Dec. 23, 2003, U.S. patent application Ser. No. 10/745,047, entitled "Method And System For Automatically Renaming Logical Circuit Identifiers For Rerouted Logical Circuits In A Data Network," filed on Dec. 23, 2003, U.S. patent application Ser. No. 10/745,170, entitled "Method And System For Automatically Identifying A Logical Circuit Failure In A Data Network," filed on Dec. 23, 2003, and U.S. patent application Ser. No. 10/744,921, entitled "Method And System For Automatically Rerouting Logical Circuit Data In A Data Network," filed on Dec. 23, 2003, All of the above-referenced applications are assigned to the same assignee as this patent and are expressly incorporated herein by reference.

TECHNICAL FIELD

The present invention relates to the routing of data using logical circuits in a data network. More particularly, the present invention is related to fail-safe renaming of logical circuit identifiers for rerouted logical circuits in a data network.

BACKGROUND OF THE INVENTION

Data networks contain various network devices, such as switches, for sending and receiving data between two locations. For example, frame relay and Asynchronous Transfer Mode ("ATM") networks contain interconnected network devices that allow data packets or cells to be channeled over a circuit through the network from a host device to a remote device. For a given network circuit, the data from a host device is delivered to the network through a physical circuit such as a T1 line that links to a switch of the network. The remote device that communicates with the host through the network also has a physical circuit to a switch of the network. A network circuit also includes a logical circuit which includes a variable communication path for data between the switches associated with the host and the remote device.

In large-scale networks, the host and remote end devices of a network circuit may be connected across different local access and transport areas ("LATAs") which may in turn be connected to one or more Inter-Exchange Carriers ("IEC") for transporting data between the LATAs. These connections are made through physical trunk circuits utilizing fixed logical connections known as Network-to-Network Interfaces ("NNIs").

Periodically, failures may occur to the trunk circuits or the NNIS of network circuits in large-scale networks causing lost data. Currently, such network circuit failures are handled by dispatching technicians on each end of the network circuit (i.e., in each LATA) in response to a reported failure. The technicians manually access a logical element module to troubleshoot the logical circuit portion of the network circuit. The logical element module communicates with the switches in the data network and provides the technician with the status of the logical connections which make up the logical circuit. Once the technician determines the status of a logical connection at one end of a logical circuit (e.g., the host end), the technician then must access a network database to determine the location of the other end of the logical circuit so that its status may also be ascertained. If the technician determines the logical circuit is operating properly, the technician then accesses a physical element module to troubleshoot the physical circuit portion of the network circuit to determine the cause of the failure and then repair it. If, while troubleshooting a network circuit, the technician determines that a network circuit will be "down" (i.e., losing data) for an extended time period, the technician may manually reroute the data from a failed network circuit to an available unused or "backup" network circuit while the failed network circuit is being repaired.

Current methods of repairing network circuits, however, do not include tracking of rerouted network circuits. For example, while repairing a network circuit, data may be rerouted to a backup circuit having an identification which is different than the original network circuit which failed. In order to access this information, a technician would be required to manually access the network database to lookup the identification of the failed network circuit and cross-reference this information with data obtained from the logical element module to identify the backup circuit used for rerouting network circuit data. Moreover, there is currently no way to monitor or track the performance of backup network circuits over time such that underperforming or over-utilized backup circuits may be identified.

It is with respect to these considerations and others that the present invention has been made.

SUMMARY OF THE INVENTION

In accordance with the present invention, the above and other problems are solved by methods and a system for fail-safe renaming of logical circuit identifiers for rerouted logical circuits in a data network. One method includes providing a network management module for renaming a first logical circuit identifier for a first logical circuit in the data network to a second logical circuit identifier for a second logical circuit. The second logical circuit is utilized for rerouting data from the first logical circuit in the data network. The method further includes renaming a logical circuit label for the first logical circuit in a logical element module in communication with the network management module. The renamed logical circuit label includes the first logical circuit identifier. The renamed logical circuit label is utilized to indicate that the logical circuit data from the first logical circuit has been rerouted.

In renaming the first logical circuit identifier to the second logical circuit identifier, the method may further include accessing a network device provisioned for routing data over the first logical circuit in the data network, deleting the first logical circuit in the network device upon detecting a failure in the first logical circuit, and provisioning the second logical circuit in the network device for rerouting the data from the first logical circuit, renaming the first logical circuit identifier to the second logical circuit identifier. During provisioning of the second logical circuit, the second logical circuit identifier is assigned to the second logical circuit.

The second logical circuit may be a logical failover circuit in the data network which may be a currently unused logical circuit in the data network. The logical circuit identifiers may be data link connection identifiers ("DLCIs") or virtual path/virtual circuit identifiers ("VPI/VCIs"). The first and second logical circuits may be either permanent virtual circuits ("PVCs") or switched virtual circuits ("SVCs"). The data network may be either a frame relay network or an asynchronous transfer mode ("ATM") network.

Another method for fail-safe renaming of logical circuit identifiers for rerouted logical circuits in a data network includes providing a network management module for accessing a network device provisioned for routing data over a first logical circuit in the data network. The network management module is further utilized for deleting the first logical circuit in the network device upon detecting a failure in the first logical circuit and provisioning a second logical circuit in the network device for rerouting the data from the first logical circuit. In provisioning the second logical circuit, the network management module is utilized to assign a second logical circuit identifier to identify the second logical circuit. The network management module is further utilized for renaming a first logical circuit identifier to the second logical circuit identifier and renaming a logical circuit label for the first logical circuit in a logical element module in communication with the network management module. The renamed logical circuit label includes the first logical circuit identifier and is utilized to indicate that the logical circuit data from the first logical circuit has been rerouted.

In accordance with other aspects, the present invention relates to a system for fail-safe renaming of logical circuit identifiers for rerouted logical circuits in a data network. The system includes a network device for establishing a communication path for a logical circuit and a logical failover circuit in the data network, a logical element module in communication with the network device for configuring the logical circuit and the logical failover circuit, and a network management module in communication with the logical element module. The network management module is utilized for identifying a failure in the logical circuit, deleting the communication path for the failed logical circuit in the network device, establishing the communication path for the logical failover circuit to reroute the data from the failed logical circuit, assigning a logical failover circuit identifier to identify the logical failover circuit, renaming a logical circuit identifier for the failed logical circuit to the logical failover circuit identifier in the logical element module, and renaming a logical circuit label for the failed logical circuit in the logical element module. The renamed logical circuit label is utilized to indicate that the logical circuit data from the failed logical circuit has been rerouted.

These and various other features as well as advantages, which characterize the present invention, will be apparent from a reading of the following detailed description and a review of the associated drawings.

DETAILED DESCRIPTION OF THE INVENTION

Figure 1:
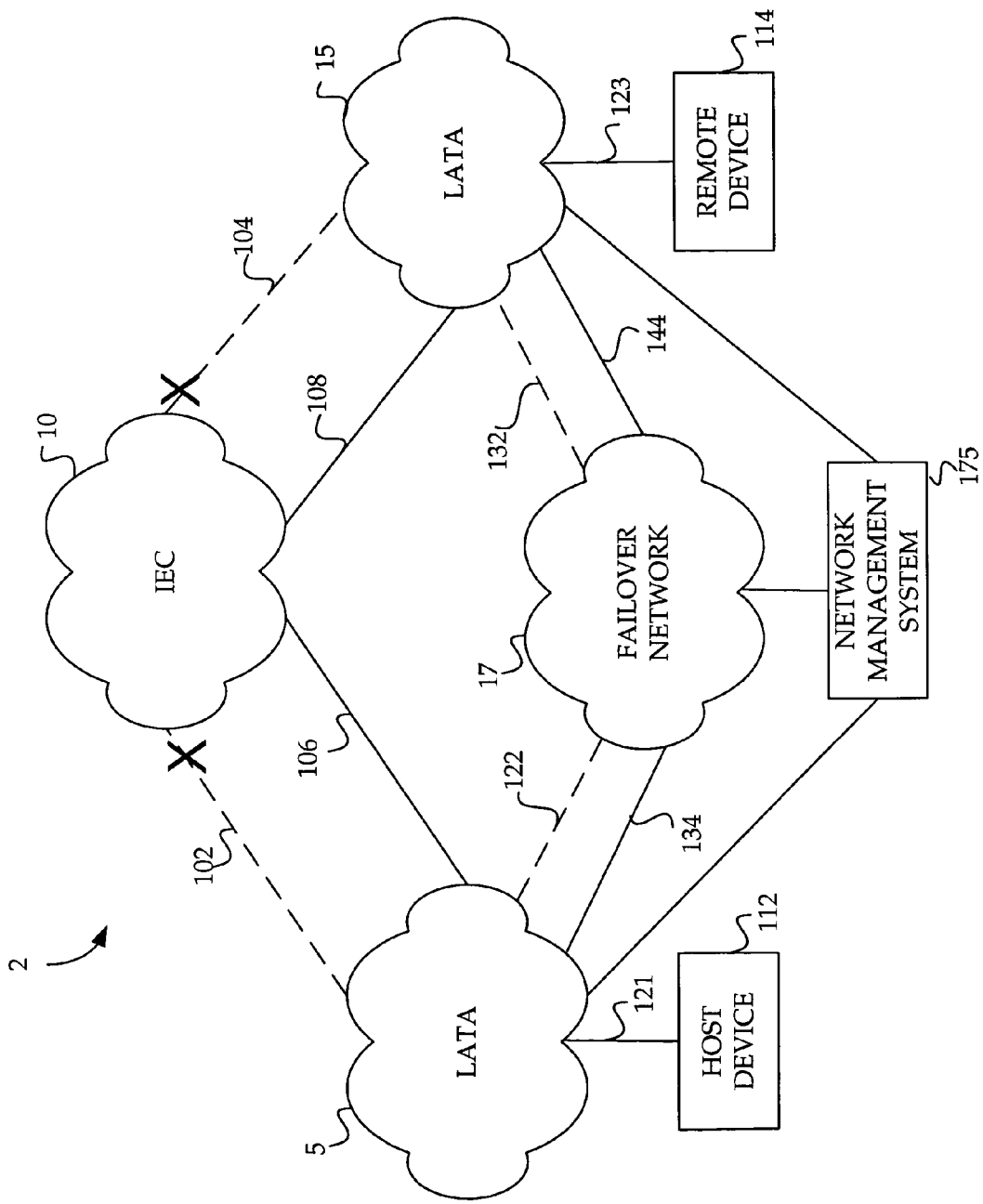
FIG. 1 illustrates a data network according to an embodiment of the invention.

Embodiments of the present invention provide for methods and a system for fail-safe renaming of logical circuit identifiers for rerouted logical circuits in a data network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

Embodiments of the present invention may be generally employed in a data network 2 as shown in FIG. 1. The data network 2 includes local access and transport areas ("LATAs") 5 and 15 which are connected by an Inter-Exchange Carrier ("IEC") 10. It should be understood that the LATAs 5 and 15 may be data networks operated by a commonly owned Local Exchange Carrier ("LEC"). It should be further understood that the IEC 10 may include one or more data networks which may be operated by a commonly owned IEC. It will be appreciated by those skilled in the art that the data network 2 may be a frame relay network, asynchronous transfer mode ("ATM") network, or any other network capable of communicating data conforming to Layers 2-4 of the Open Systems Interconnection ("OSI") model developed by the International Standards Organization, incorporated herein by reference. It will be appreciated that these networks may include, but are not limited to, communications protocols conforming to the Multiprotocol Label Switching Standard ("MPLS") networks and the Transmission Control Protocol/Internet Protocol ("TCP/IP"), which are known to those skilled in the art.

The data network 2 includes a network circuit which channels data between a host device 112 and a remote device 114 through the LATA 5, the IEC 10, and the LATA 15. It will be appreciated by those skilled in the art that the host and remote devices 112 and 114 may be local area network ("LAN") routers, LAN bridges, hosts, front end processors, Frame Relay Access Devices ("FRADs"), or any other device with a frame relay, ATM, or network interface. It will be further appreciated that in the data network 2, the LATAs 5 and 15 and the IEC 10 may include network elements (not shown) which support interworking to enable communications between host and remote devices supporting dissimilar protocols. Network elements in a data network supporting interworking may translate frame relay data packets or frames sent from a host FRAD to ATM data packets or cells so that a host device may communicate with a remote device having an ATM interface. The LATAs 5 and 15 and the IEC 10 may further include one or more interconnected network elements, such as switches (not shown), for transmitting data. An illustrative LEC data network will be discussed in greater detail in the description of FIG. 2 below.

The network circuit between the host device 112 and the remote device 114 in the data network 2 includes a physical circuit and a logical circuit. As used in the foregoing description and the appended claims, a physical circuit is defined as the physical path that connects the end point of a network circuit to a network device. For example, the physical circuit of the network circuit between the host device 112 and the remote device 114 includes the physical connection 121 between the host device 112 and the LATA 5, the physical connection 106 between the LATA 5 and the IEC 10, the physical connection 108 between the IEC 10 and the LATA 15, and the physical connection 123 between the LATA 15 and the remote device 114. Routers and switches within the LATAs 5 and 15 and the IEC 10 carry the physical signal between the host and remote end devices 112 and 114 through the physical circuit.

It should be understood that the host and remote devices may be connected to the physical circuit described above using user-to-network interfaces ("UNIs"). As is known to those skilled in the art, an UNI is the physical demarcation point between a user device (e.g, a host device) and a public data network. It will further be understood by those skilled in the art that the physical connections 106 and 108 may include trunk circuits for carrying the data between the LATAs 5 and 15 and the IEC 10. It will be further understood by those skilled in the art that the connections 121 and 123 may be any of various physical communications media for communicating data such as a 56 Kbps line or a T1 line carried over a four-wire shielded cable or over a fiber optic cable.

As used in the foregoing description and the appended claims, a logical circuit is defined as a portion of the network circuit wherein data is sent over variable communication data paths or logical connections established between the first and last network devices within a LATA or IEC network and over fixed communication data paths or logical connections between LATAs (or between IECs). Thus, no matter what path the data takes within each LATA or IEC, the beginning and end of each logical connection between networks will not change. For example, the logical circuit of the network circuit in the data network 2 may include a variable communication path within the LATA 5 and a fixed communication path (i.e., the logical connection 102) between the LATA 5 and the IEC 10. It will be understood by those skilled in the art that the logical connections 102 and 104 in the data network 2 may include network-to-network interfaces ("NNIs") between the last sending switch in a LATA and the first receiving switch in an IEC.

As is known to those skilled in the art, each logical circuit in a data network may be identified by a unique logical identifier. In frame relay networks, the logical identifier is called a Data Link Connection Identifier ("DLCI") while in ATM networks the logical identifier is called a Virtual Path Identifier/Virtual Circuit Identifier ("VPI/VCI"). In frame relay networks, the DLCI is a 10-bit address field contained in the header of each data frame and contains identifying information for the logical circuit as well as information relating to the destination of the data in the frame and service parameters for handling network congestion. For example, in the data network 2 implemented as a frame relay network, the designation DLCI 100 may be used to identify the logical circuit between the host device 112 and the remote device 114. It will be appreciated that in data networks in which logical circuit data is communicated through more than one carrier (e.g., an LEC and an IEC) the DLCI designation for the logical circuit may change in a specific carrier's network. For example, in the data network 2, the designation DLCI 100 may identify the logical circuit in the LATA 5 and LATA 15 but the designation DLCI 800 may identify the logical circuit in the IEC 10.

Illustrative service parameters which may be included in the DLCI include a Committed Information Rate ("CIR") parameter and a Committed Burst Size ("Bc") parameter. As is known to those skilled in the art, the CIR represents the average capacity of the logical circuit and the Bc represents the maximum amount of data that may be transmitted. It will be appreciated that the logical circuit may be provisioned such that when the CIR or the Bc is exceeded, the receiving switch in the data network will discard the frame. It should be understood that the logical circuit parameters are not limited to CIR and Bc and that other parameters known to those skilled in the art may also be provisioned, including, but not limited to, Burst Excess Size ("Be") and Committed Rate Measurement Interval ("Tc"). In ATM networks, the VPI/VCI is an address field contained in the header of each ATM data cell and contains identifying information for the logical circuit as well as information specifying a data cell's destination and specific bits which may indicate, for example, the existence of congestion in the network and a threshold for discarding cells.

It should be understood that the logical circuit in the data network 2 may be a permanent virtual circuit ("PVC") available to the network at all times or a temporary or a switched virtual circuit ("SVC") available to the network only as long as data is being transmitted. It should be understood that the data network 2 may further include additional switches or other interconnected network elements (not shown) creating multiple paths within each LATA and IEC for defining each PVC or SVC in the data network. It will be appreciated that the data communicated over the logical connections 102 and 104 may be physically carried by the physical connections 106 and 108.

The data network 2 may also include a failover network 17 for rerouting logical circuit data, according to an embodiment of the invention. The failover network 17 may include a network failover circuit including physical connections 134 and 144 and logical connections 122 and 132 for rerouting logical circuit data in the event of a failure in the network circuit between the host device 112 and the remote device 114. The failover network 17 will be described in greater detail in the description of FIG. 4 below. The data network 2 may also include a network management system 175 in communication with the LATA 5, the LATA 15, and the failover network 17. The network management system 175 may be utilized to obtain status information for the logical and physical circuit between the host device 112 and the remote device 114. The network management system 175 may also be utilized for rerouting logical data in the data network 2 between the host device 112 and the remote device 114. The network management system 175 will be discussed in greater detail in the description of FIG. 3 below.

Figure 2:
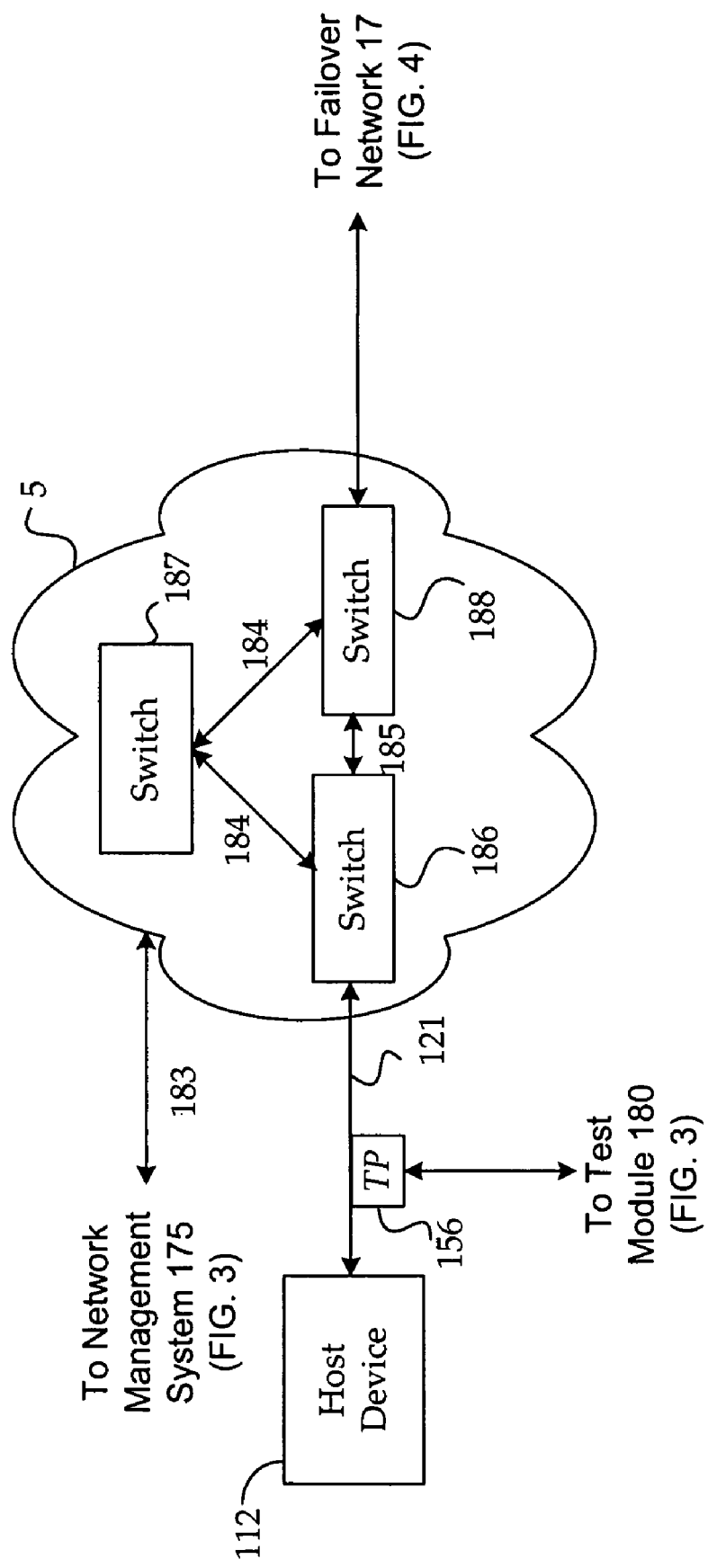
FIG. 2 illustrates a local access and transport area ("LATA") in the data network of FIG. 1, according to an embodiment of the invention.

FIG. 2 illustrates the LATA 5 in the data network 2 described in FIG. 1 above, according to an embodiment of the present invention. As shown in FIG. 2, the LATA 5 includes interconnected network devices such as switches 186, 187, and 188. It will be appreciated that the data network 2 may also contain other interconnected network devices and elements (not shown) such as digital access and cross connect switches ("DACS"), channel service units ("CSUs"), and data service units ("DSUs"). As discussed above in the description of FIG. 1, the connection data paths of a logical circuit within a data network may vary between the first and last network devices in a data network. For example, as shown in FIG. 2, the logical circuit in the LATA 5 may include the communication path 185 between the switches 186 and 188 or the communication path 184 between the switches 186, 187, and 188. As discussed above, it should be understood that the actual path taken by data through the LATA 5 is not fixed and may vary from time to time, such as when automatic rerouting takes place.

It will be appreciated that the switches 186, 187, and 188 may include a signaling mechanism for monitoring and signaling the status of the logical circuit in the data network 2. Each time a change in the status of the logical circuit is detected (e.g., a receiving switch begins dropping frames), the switch generates an alarm or "trap" which may then be communicated to a management station, such as a logical element module (described in detail in the description of FIG. 3 below), in the network management system 175. In one embodiment, the signaling mechanism may be in accord with a Local Management Interface ("LMI") specification, which provides for the sending and receiving of "status inquiries" between a data network and a host or remote device. The LMI specification includes obtaining status information through the use of special management frames (in frame relay networks) or cells (in ATM networks). In frame relay networks, for example, the special management frames monitor the status of logical connections and provide information regarding the health of the network. In the data network 2, the host and remote devices 112 and 114 receive status information from the individual LATAs they are connected to in response to a status request sent in a special management frame or cell. The LMI status information may include, for example, whether or not the logical circuit is congested or whether or not the logical circuit has failed. It should be understood that the parameters and the signaling mechanism discussed above are optional and that other parameters and mechanisms may also be utilized to obtain connection status information for a logical circuit.

Figure 3:
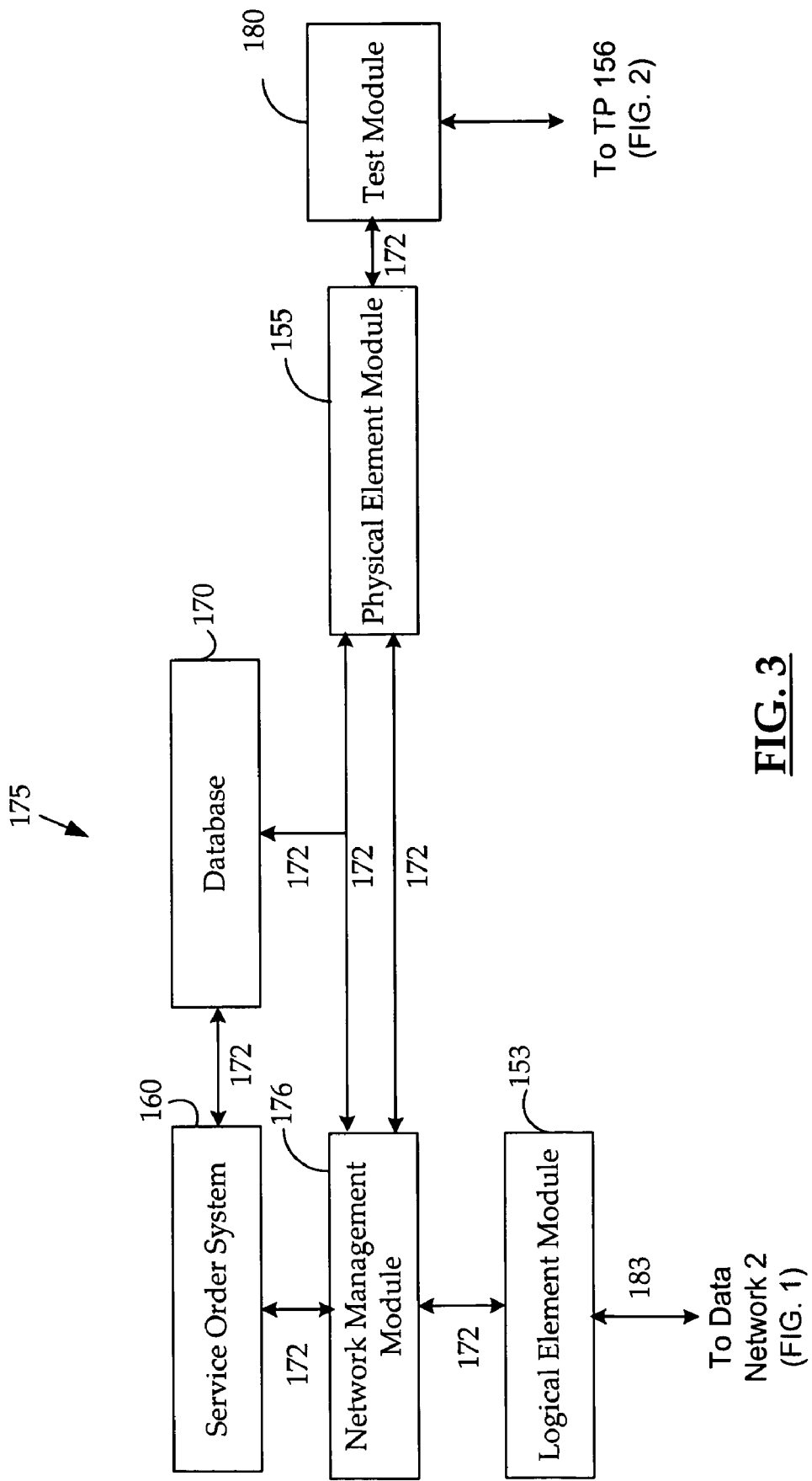
FIG. 3 illustrates a network management system which may be utilized to automatically rename logical circuit identifiers for rerouted logical circuits in the data network of FIG. 1, according to an embodiment of the invention.

FIG. 3 illustrates the network management system 175 which may be utilized to automatically reroute logical circuit data from a failed logical circuit in the data network of FIG. 1, according to an embodiment of the invention. The network management system 175 includes a service order system 160, a network database 170, a logical element module 153, a physical element module 155, a network management module 176, and a test module 180. The service order system 160 is utilized in the data network 2 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 172. The network database 170 assigns and stores the parameters for the physical circuit for the network circuit such as a port number on the switch 186 for transmitting data over the physical connection 121 to and from the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system ("WFA/C") (not shown) used to assign resources (i.e., technicians) to work on installing the physical circuit.

The network management system 175 also includes the logical element module 153 which is in communication with the switches in the data network 2 through management trunks 183. The logical element module 153 runs a network management application program to monitor the operation of logical circuits which includes receiving trap data generated by the switches which indicate the status of logical connections. The trap data may be stored in the logical element module 153 for later analysis and review. The logical element module 153 is also in communication with the network database 170 via management trunks 172 for accessing information stored in the network database 170 regarding logical circuits, such as the logical circuit identifier data. In an alternative embodiment, the logical element module 153 may also be utilized to store the logical circuit identifier data. The logical circuit identifier data may include, for example, the DLCI or VPI/VCI header information for each data frame or cell in the logical circuit including the circuit's destination and service parameters.

It will be appreciated that in one embodiment, each logical circuit identifier may be included in a logical circuit label stored in the logical element module 153. The logical circuit label may include a customer ID, the location of the host device for the circuit, the location of the remote or end device for the circuit, and one or more logical circuit IDs for the circuit between the host device and the remote device. For example, a logical circuit label between the host device 112 and the remote device 114 in the data network 2 of FIG. 1. may be as follows: "Trustmark1_miamibirmingham_101_880." The logical circuit label in the aforementioned example indicates that the customer ID is "Trustmark1" for a logical circuit between Miami and Birmingham. The label also indicates that the logical circuit ID at the host and remote ends of the circuit is "101" and that the logical circuit ID for the portion of the circuit which passes through the IEC 10 is "880." The logical element module 153 may consist of terminals (not shown) that display a map-based graphical user interface ("GUI") of the logical connections in the data network. An illustrative logical element module is the NAVISCORE™ system marketed by LUCENT TECHNOLOGIES, Inc. of Murray Hill, NJ.

The network management system 175 further includes the physical element module 155 in communication with the physical connections of the network circuit via management trunks (not shown). The physical element module 155 runs a network management application program to monitor the operation and retrieve data regarding the operation of the physical circuit. The physical element module 155 is also in communication with the network database 170 via management trunks 172 for accessing information regarding physical circuits, such as line speed. Similar to the logical element module 153, the physical logical element module 155 may also consist of terminals (not shown) that display a map-based GUI of the physical connections in the LATA 5. An illustrative physical element module is the Integrated Testing and Analysis System ("INTAS"), marketed by TELECORDIA™ TECHNOLOGIES, Inc. of Morristown, N.J., which provides flow-through testing and analysis of telephony services.

The physical element module 155 troubleshoots the physical connections for a physical circuit by communicating with test module 180, which interfaces with the physical connections via test access point 156. The test module 180 obtains the status of the physical circuit by transmitting "clean" test signals to test access point 156 (shown in FIG. 2) which "loops back" the signals for detection by the test module 180. It should be understood that there may be multiple test access points on each of the physical connections for the physical circuit.

The network management system 175 further includes the network management module 176 which is in communication with the service order system 160, the network database 170, the logical element module 153, and the physical element module 155 through communications channels 172. It should be understood that in one embodiment, the network management system 175 may also be in communication with the LATA 15, the IEC 10, and the failover network 17. The communications channels 172 may be on a LAN. The network management module 176 may consist of terminals (not shown), which may be part of a general-purpose computer system that displays a map-based GUI of the logical connections in data networks. The network management module 176 may communicate with the logical element module 153 and the physical element module 155 using a Common Object Request Broker Architecture ("CORBA"). As is known to those skilled in the art, CORBA is an open, vendor-independent architecture and infrastructure which allows different computer applications to work together over one or more networks using a basic set of commands and responses. The network management module 176 may also serve as an interface for implementing logical operations to provision and maintain network circuits. The logical operations may be implemented as machine instructions stored locally or as instructions retrieved from the logical and physical element modules 153 and 155. An illustrative method detailing the provisioning and maintenance of network circuits in a data network is presented in U.S. patent application Ser. No. 10/348,592, entitled "Method And System For Provisioning And Maintaining A Circuit In A Data Network," filed on Jan. 23, 2003, and assigned to the same assignee as this patent, which is expressly incorporated herein by reference. An illustrative network management module is the Broadband Network Management System® ("BBNMS") marketed by TELECORDIA™ TECHNOLOGIES, Inc. of Morristown, N.J.

Figure 4:
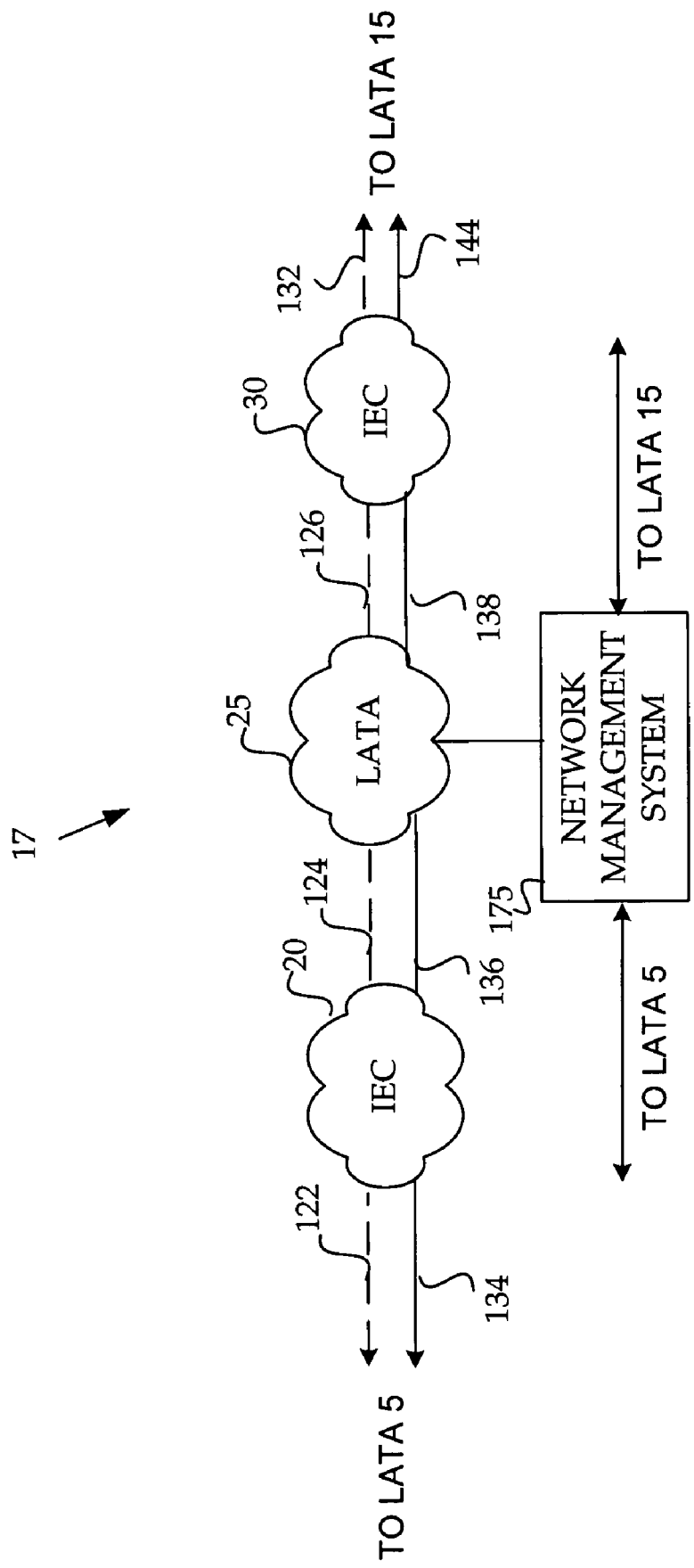
FIG. 4 illustrates a failover data network for rerouting logical circuit data, according to an embodiment of the invention.

FIG. 4 illustrates an illustrative failover data network for rerouting logical circuit data, according to one embodiment of the present invention. As shown in FIG. 4, the failover network 17 includes an IEC 20, a LATA 25, and an IEC 30. The failover network further includes a network failover circuit which includes a physical failover circuit and a logical failover circuit. The physical failover circuit includes the physical connection 134 between the LATA 5 (shown in FIG. 1) and the IEC 20, the physical connection 136 between the IEC 20 and the LATA 25, the physical connection 138 between the LATA 25 and the IEC 30, and the physical connection 144 between the IEC 30 and the LATA 15 (shown in FIG. 1). Similarly, the logical failover circuit may include the logical connection 122 between the LATA 5 (shown in FIG. 1) and the IEC 20, the logical connection 124 between the IEC 20 and the LATA 25, the logical connection 126 between the LATA 25 and the IEC 30, and the logical connection 132 between the IEC 30 and the LATA 15 (shown in FIG. 1). It should be understood that in one embodiment, the network failover circuit illustrated in the failover network 17 may include a dedicated physical circuit and a dedicated logical circuit provisioned by a network service provider serving the LATAs 5, 15, and 25 and the IECs 20 and 30, for rerouting logical data from a failed logical circuit.

Figure 5:
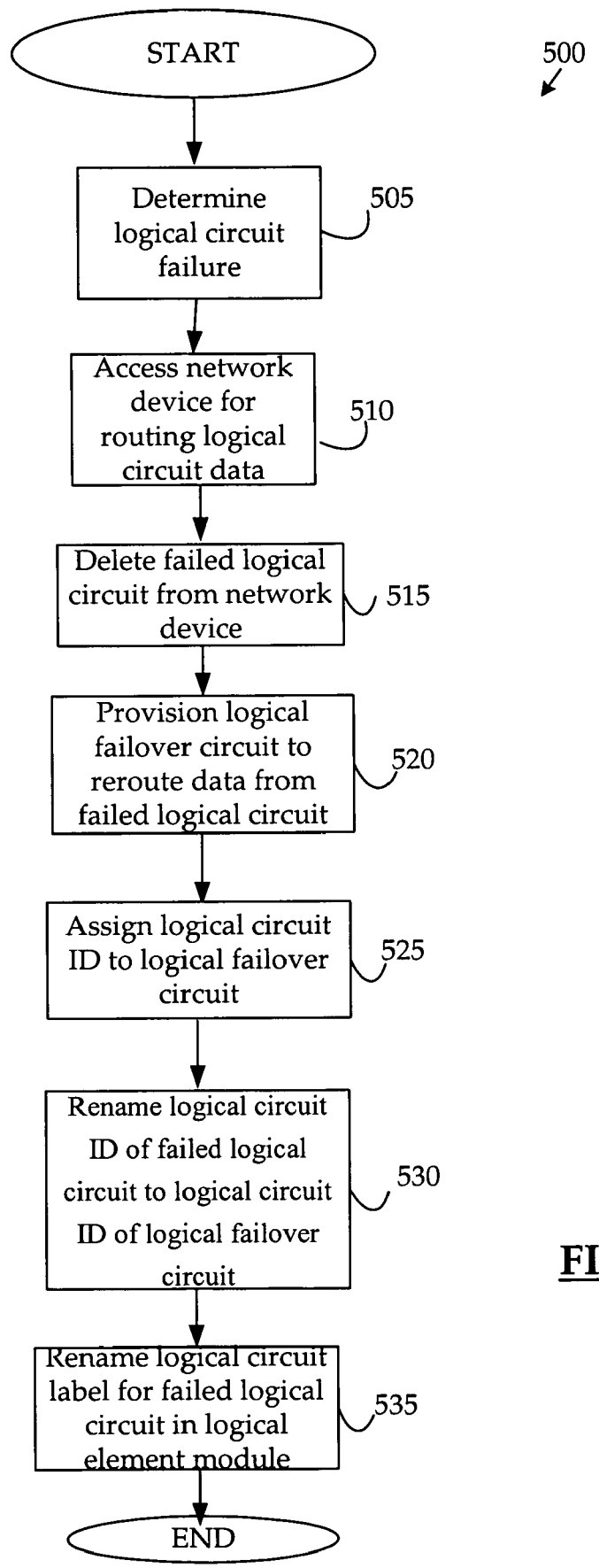
FIG. 5 is a flowchart describing logical operations for fail-safe renaming of logical circuit identifiers for rerouted logical circuits in the data network of FIG. 1, according to an embodiment of the invention.

FIG. 5 is a flowchart describing logical operations 500 for fail-safe renaming of logical circuit identifiers for rerouted logical circuits in a data network, according to an embodiment of the invention. It will be appreciated that the logical operations 500 may be initiated by a customer report of a logical circuit failure received in the data network 2. For example, a customer at the remote device 114 may determine that the remote device 114 is not receiving any data (e.g., frames or cells) sent from the host device 112 (e.g., by reviewing LMI status information in the host device). After receiving the customer report, the network service provider providing the network circuit may open a trouble ticket in the service order system 160 to troubleshoot the logical circuit.

The logical operations 500 begin at operation 505 where the network management module 176 determines a failure in a logical circuit in the data network 2. It should be understood that a logical circuit failure occurs when one or more logical connections in a logical circuit have failed. As discussed above in the description of FIG. 2, trap data indicating a logical connection failure may include status information indicating that a switch in the data network is discarding frames or cells. Such an event may occur, for example, when the maximum CIR or Bc (as specified in the DLCI of a frame in a frame relay network, for example) is exceeded. The trap data may be received from the logical element module 153 and may be generated by one or more network devices or switches in the data network which indicate the status of one or more logical connections making up the logical circuit. It will be appreciated that in one embodiment of the present invention, the network management module 176 may be configured to automatically monitor the logical circuits for trap data to identify the logical circuit failure. An illustrative method detailing the automatic monitoring of logical circuits to identify a logical circuit failure in a data network is presented in co-pending U.S. patent application Ser. No. 10/745,170, entitled "Method And System For Automatically Identifying A Logical Circuit Failure In A Data Network," filed on Dec. 23, 2003, and assigned to the same assignee as this patent, which is expressly incorporated herein by reference.

Once a logical circuit failure is determined, the logical operations 500 continue from operation 505 to operation 510 where the network management module 176 initiates the rerouting of the failed logical circuit data by accessing a network device or switch provisioned for routing data over the failed logical circuit in the data network. It will be appreciated that the network management module 176 includes a provisioning function for adding and deleting logical circuits from network devices in a data network. The logical operations 500 then continue from operation 510 to operation 515 where the network management module 176 deletes the failed logical circuit from the network device. The logical operations 500 then continue from operation 515 to operation 520 where the network management module 176 provisions a logical failover circuit for rerouting the data from the failed logical circuit. During the provisioning of the logical failover circuit, the network management module 176 assigns a logical circuit identifier to identify the logical failover circuit at operation 525 and renames the logical circuit identifier of the failed logical circuit to the logical circuit identifier of the logical failover circuit at operation 530. The logical operations 500 then continue from operation 530 to operation 535.

At logical operation 535, the network management device 176 accesses the logical element module 153 and renames the logical circuit label for the failed logical circuit. It will be appreciated that the renamed logical circuit label includes the logical circuit identifier and the status of the failed logical circuit and the status of the failed logical circuit. For example, in the data network 2 of FIG. 1, a rerouted logical circuit between the host device 112 and the remote device 114 over the failover network 17 may result in the following renamed logical circuit label in the logical element module 153: "Trustmark1_miamibirmingham_reroute_101_880." The logical circuit label in the aforementioned example indicates that the logical circuit identified by customer ID "Trustmark1" for communicating data between Miami and Birmingham has been rerouted. The logical circuit IDs "101" and "880" indicate the identification of the logical circuit in the LATA data networks 5 and 15 (i.e., "101") and in the IEC data network 10 (i.e., "880"). As discussed above with respect to FIG. 1, the logical circuit ID for a single logical circuit may change if the logical circuit communicates data through more than one network. It will be appreciated that logical circuits entirely within one data network may be identified by a single logical circuit ID in the logical circuit label. The logical operations 500 then end.

Although, as discussed above, the network management module 176 may be utilized to track the rerouting of logical circuits in the data network 2, it will be appreciated that the renamed logical circuit label in the logical element module 153 may be utilized as a fail-safe to indicate the status of a logical circuit in the event of a failure in the network management module 176. It will be appreciated that the embodiments of the invention described above provide for methods and a system for fail-safe renaming of logical circuit identifiers for rerouted logical circuits in a data network. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for fail-safe renaming of logical circuit identifiers for rerouted logical circuits in a data network, the method comprising:
    providing a network management module in communication with first and second local access and transport areas and a failover network, the first local access and transport area in communication with the second local access and transport area via an inter-exchange carrier, the failover network in communication with the first and second local access and transport areas and separate from the inter-exchange carrier, and the network management module to:
        monitor switches of a first logical circuit, the first logical circuit connecting the first and second local access and transport areas via the inter-exchange carrier, the switches located in the first and second local access and transport areas;
        rename a first logical circuit identifier for the first logical circuit to a second logical circuit identifier for a second logical circuit utilized for rerouting data from the first logical circuit, the second logical circuit connecting the first and second local access and transport areas via the failover network; and
        receive status information indicating that one of the switches is discarding frames or cells; and
    identifying, in response to the status information, a failure in the first logical circuit; and
    rerouting the data via the second logical circuit.

2. The method of claim 1, wherein the network management module renames the first logical circuit identifier for the first logical circuit to the second logical circuit identifier for the second logical circuit utilized for rerouting data from the first logical circuit, by:
    accessing a network device provisioned for routing data over the first logical circuit;
    deleting the first logical circuit in the network device upon detecting the failure in the first logical circuit;
    provisioning the second logical circuit in the network device for rerouting the data from the first logical circuit, wherein provisioning the second logical circuit includes assigning the second logical circuit identifier to identify the second logical circuit; and
    renaming the first logical circuit identifier to the second logical circuit identifier.

3. The method of claim 1, wherein the second logical circuit is a logical failover circuit.

4. The method of claim 1, wherein the second logical circuit is a currently unused logical circuit.

5. The method of claim 1, wherein the first logical circuit identifier is a data link connection identifier (DLCI).

6. The method of claim 1, wherein the second logical circuit identifier is a data link connection identifier (DLCI).

7. The method of claim 1, wherein the first logical circuit identifier is a virtual path/virtual circuit identifier (VPI/VCI).

8. The method of claim 1, wherein the second logical circuit identifier is a virtual path/virtual circuit identifier (VPI/VCI).

9. The method of claim 1, wherein the first and second logical circuits are permanent virtual circuits.

10. The method of claim 1, wherein the first and second logical circuits are switched virtual circuits.

11. The method of claim 1, wherein the first logical circuit is established in a frame relay network.

12. The method of claim 1, wherein the first logical circuit is established in an asynchronous transfer mode (ATM) network.

13. A system for fail-safe renaming of logical circuit identifiers for rerouted logical circuits in a data network, the system comprising:
    a network device to establish a communication path for a logical circuit and a logical failover circuit, the logical circuit connecting first and second local access and transport areas via an inter-exchange carrier, and the logical failover circuit connecting the first and second local access and transport areas via a failover network that is separate from the inter-exchange carrier;
    a logical element module in communication with the network device to configure the logical circuit and the logical failover circuit; and
    a network management module in communication with the first and second local access and transport areas and the failover network to:
        monitor switches of the logical circuit and located in the first and second local access and transport areas;
        receive status information indicating that one of the switches is discarding frames or cells;
        identify, in response to the status information, a failure in the logical circuit;
        delete the communication path for the failed logical circuit in the network device;
        establish the communication path for the logical failover circuit through the failover network to reroute data from the failed logical circuit;
        assign a logical failover circuit identifier to identify the logical failover circuit; and
        rename a logical circuit identifier for the failed logical circuit to the logical failover circuit identifier in a network database.

14. The system of claim 13, wherein the logical circuit identifier is a data link connection identifier (DLCI).

15. The system of claim 13, wherein the logical failover circuit identifier is a data link connection identifier (DLCI).

16. The system of claim 13, wherein the logical circuit identifier is a virtual path/virtual circuit identifier (VPI/VCI).

17. The system of claim 13, wherein the logical failover circuit identifier is a virtual path/virtual circuit identifier (VPI/VCI).

18. The system of claim 13, wherein the logical circuit and the logical failover circuit are permanent virtual circuits.

19. The system of claim 13, wherein the logical circuit and the logical failover circuit are switched virtual circuits.

20. The system of claim 13, wherein the logical circuit is established in a frame relay network.

21. The system of claim 13, wherein the logical circuit is established in an asynchronous transfer mode (ATM) network.

22. The method of claim 1, wherein the switches communicate the data via the first logical circuit, and wherein the network management module is separate from the switches that communicate the data.

* * * * *

UNITED STATES PATENT AND TRADEMARK OFFICE
CERTIFICATE OF CORRECTION

PATENT NO. : 7,768,904 B2  
APPLICATION NO. : 10/829495  
DATED : August 3, 2010  
INVENTOR(S) : Taylor et al.

Page 1 of 1

It is certified that error appears in the above-identified patent and that said Letters Patent is hereby corrected as shown below:

Column 11, line 57 (claim 2), insert --the-- between "rerouting" and "data"

Signed and Sealed this
Fourteenth Day of August, 2012

David J. Kappos
*Director of the United States Patent and Trademark Office*